United States Patent
Iwasa et al.

(10) Patent No.: US 8,344,094 B2
(45) Date of Patent: Jan. 1, 2013

(54) OPTICAL MATERIAL AND OPTICAL ELEMENT

(75) Inventors: Hidefumi Iwasa, Kawasaki (JP); Shigeo Kiso, Yokohama (JP); Terunobu Saitoh, Kawasaki (JP); Toshiji Nishiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 12/555,236

(22) Filed: Sep. 8, 2009

(65) Prior Publication Data

US 2010/0076106 A1 Mar. 25, 2010

(30) Foreign Application Priority Data

Sep. 22, 2008 (JP) ................................. 2008-243191
Aug. 27, 2009 (JP) ................................. 2009-197419

(51) Int. Cl.
 *C08G 73/00* (2006.01)
(52) U.S. Cl. ........ 528/373; 528/125; 528/391; 528/388; 528/488; 528/489; 528/389; 525/451
(58) Field of Classification Search ................ 528/373, 528/125, 391, 388, 488, 489, 499, 389; 525/451
See application file for complete search history.

(56) References Cited

U.S. PATENT DOCUMENTS

| | | | | |
|---|---|---|---|---|
| 5,847,877 | A | 12/1998 | Imamura et al. | 359/566 |
| 6,870,677 | B2 | 3/2005 | Ohgane | 359/565 |
| 2008/0170295 | A1 | 7/2008 | Iwasa | 359/566 |
| 2008/0200582 | A1* | 8/2008 | Craciun et al. | 522/166 |
| 2010/0109317 | A1* | 5/2010 | Hoffmuller et al. | 283/91 |

FOREIGN PATENT DOCUMENTS

WO 2008/098753 A1 8/2008

* cited by examiner

*Primary Examiner* — Shane Fang
(74) *Attorney, Agent, or Firm* — Fitzpatrick, Cella, Harper & Scinto

(57) ABSTRACT

An optical material is provided that has a high transmittance, a high refractive index, a low Abbe constant, a high secondary dispersion property, and a low water absorption rate. The optical material includes a polymer of a mixture which contains: a sulfur-containing compound represented by the following general formula (1):

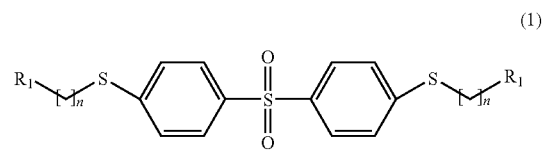

(1)

a sulfur-containing compound represented by the following general formula (2):

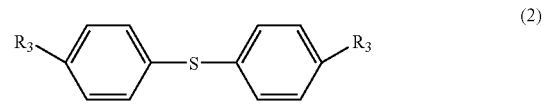

(2)

and an energy polymerization initiator, in which a content of the sulfur-containing compound represented by the chemical formula (2) is 10% by weight or more to 60% by weight or less, an Abbe constant (vd) of the polymer of the mixture satisfies $18<vd<23$, and a secondary dispersion property ($\theta g, F$) thereof satisfies $0.68<\theta g, F<0.69$.

4 Claims, 3 Drawing Sheets

OPTICAL MATERIAL AND OPTICAL ELEMENT

BACKGROUND OF THE INVENTION

1. Field of the Invention

The present invention relates to an optical material and an optical element, and more particularly, to an optical material suitable to form an optical element used for an image pickup optical system of a camera.

2. Description of the Related Art

Up to now, an example of methods of correcting chromatic aberration of an optical system including only a refraction system is a method using a combination of glass materials having different dispersion properties. For example, an objective lens of a telescope includes a positive lens made of a glass material whose Abbe constant (vd) is large and a negative lens made of a glass material having a small Abbe constant. A combination of the positive lens and the negative lens is used to correct axial chromatic aberration. However, the range of an optical constant of a usable lens is limited. Therefore, when a lens structure or the number of lenses is limited or when used glass materials are limited, the chromatic aberration may not be sufficiently corrected.

Therefore, in order to widen the ranges of the optical constants of the lenses, there is known a method of controlling the refractive index and the Abbe constant (vd) to obtain a glass material having a high refractive index and a low Abbe constant.

Further, U.S. Pat. No. 5,847,877 and U.S. Pat. No. 6,870,677 disclose that a heat-curable resin or a light-curable resin, which are excellent in terms of obtaining a desired shape by the application of heat or light or a thermoplastic resin for extrusion molding, have been used as an optical material including an organic compound.

When an optical element, which has an excellent chromatic aberration correction function and has an aspherical shape is to be manufactured, a case where a light-curable resin, a heat-curable resin, or a thermoplastic resin is molded on a spherical glass used as a base is more excellent in mass productivity, processability, and moldability than a case where an optical glass is used as a material. However, a plastic resin and a curable resin, which normally each have a high refractive index and a small Abbe constant, cause yellowing. That is, the resins cause yellowing because of their fundamental molecular structure, resin dissolution due to heating during processing or irradiation of energy such as ultraviolet light, or a change in molecular structure during reaction. An organic optical material used for the optical element is required to satisfy the need for high optical performance and at the same time to be more transparent.

Many optical elements obtained by molding the resin instead of the optical glass are required to have, in addition to a high transmittance and excellent optical properties, environmental reliability sufficient to obtain these properties. In particular, there is a problem that, when the optical properties are varied by the absorption of water of the molded resin or when an element shape is changed by expansion due to the absorption of water, desired element performance is not obtained. In order to solve this problem, low water-absorption resins having mainly an alicyclic skeleton have been developed and made commercially available. However, of the materials having the alicyclic molecular structure, a material satisfying various optical properties required for the optical elements has not been obtained under the current circumstances.

Meanwhile, the inventors of the present invention found that not only a high refractive index and a low Abbe constant, but also a secondary dispersion property ($\theta g,F$) are important as material properties for providing the optical element with the chromatic aberration correction function. That is, a material having a secondary dispersion property larger than a general material (refractive index extraordinary dispersion property) is very effective for chromatic aberration correction in optical design.

FIG. 1A is a graph illustrating a relationship between the Abbe constant vd and the secondary dispersion property $\theta g,F$ in each of materials commercially available as optical materials. In FIG. 1A, the ordinate indicates the secondary dispersion property $\theta g,F$ and the abscissa indicates the Abbe constant vd. FIG. 1B is a graph illustrating a relationship between the Abbe constant vd and the refractive index nd in each of materials commercially available as optical materials. In FIG. 1B, the ordinate indicates the refractive index nd and the abscissa indicates the Abbe constant vd.

Of the optical materials having the relationships illustrated in FIGS. 1A and 1B, examples of an optical material having a high refractive index, a low Abbe constant, and a high secondary dispersion property include UV 1000 (produced by Mitsubishi Chemical Corporation), MPV (produced by Sumitomo Seika Chemicals Co., Ltd.), and Vinylcarbazole (produced by Tokyo Chemical Industry Co., Ltd.). UV1000 has a relatively high transparent property, but water absorbency thereof is low, and thus reliability thereof is not sufficient. MPV or Vinylcarbazole is relatively excellent in water absorbency, but reliability thereof is not sufficient in view of coloring due to yellowing.

SUMMARY OF THE INVENTION

The present invention has been made to solve the problem as described above. It is an object of the present invention to provide an optical material which has a high transmittance, a high refractive index, a low Abbe constant vd, a high secondary dispersion property $\theta g,F$ (refractive index extraordinary dispersion property), and a low water-absorption rate. It is another object of the present invention to provide a cured film, an optical element, and an optical system, each of which uses the optical material described above.

In order to achieve the above-mentioned objects, the present invention provides an optical material including a polymer of a mixture which contains: a sulfur-containing compound represented by the following general formula (1); a sulfur-containing compound represented by the following general formula (2); and an energy polymerization initiator, in which a content of the sulfur-containing compound represented by the general formula (2) is 10% by weight or more to 60% by weight or less, an Abbe constant vd of the polymer of the mixture satisfies $18 < vd < 23$, and a secondary dispersion property $\theta g,F$ thereof satisfies $0.68 < \theta g,F < 0.69$, General Formula (1):

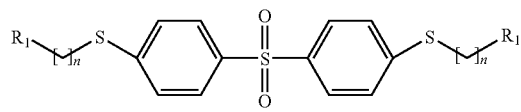

where $R_1$ is $-X_1-COCR_2=CH_2$ or $-X_1-CH=CH_2$, $R_2$ is H or $CH_3$, $X_1$ is O or S, and n is an integer of 1 to 4, General Formula (2):

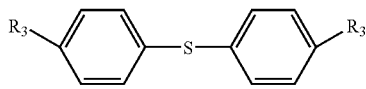

where $R_3$ is —S—CH=CH$_2$ or —CH=CH$_2$.

The present invention also provides an optical element obtained by curing the above-mentioned optical material, in which an internal transmittance of the optical element with respect to light having a wavelength of 430 nm in a thickness of 1.5 mm is larger than 80% and smaller than 99%.

Further features of the present invention become apparent from the following description of exemplary embodiments with reference to the attached drawings.

DESCRIPTION OF THE EMBODIMENTS

Figure 1A:
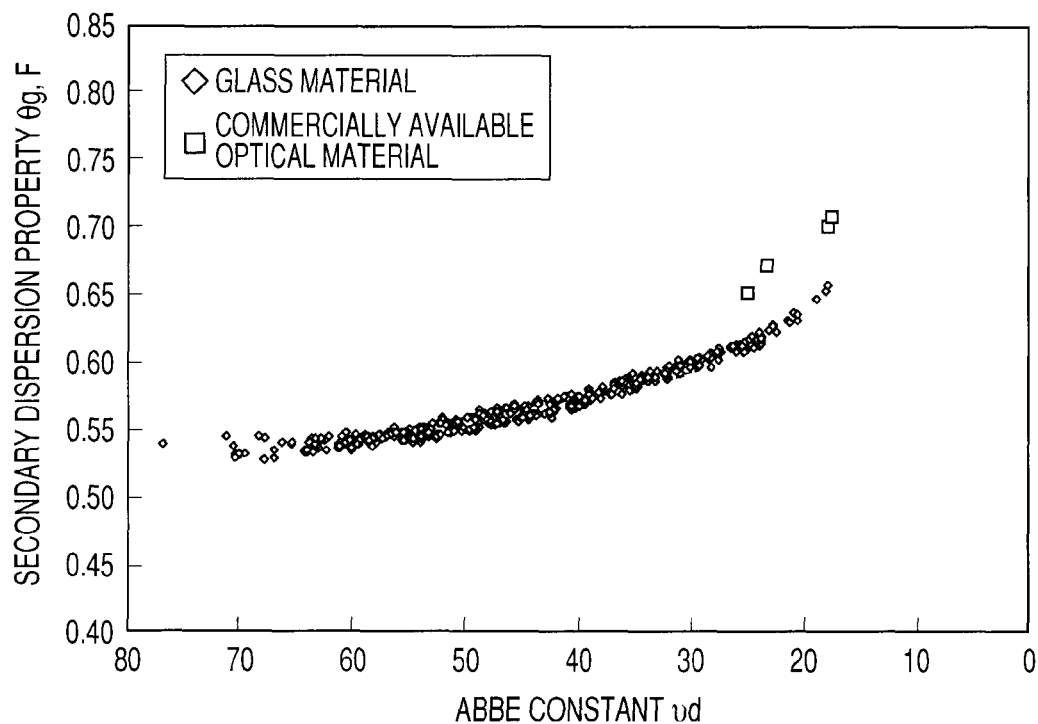
FIG. 1A is a distribution graph illustrating a relationship between an Abbe constant and a secondary dispersion property in each of normal optical materials.
Figure 1B:
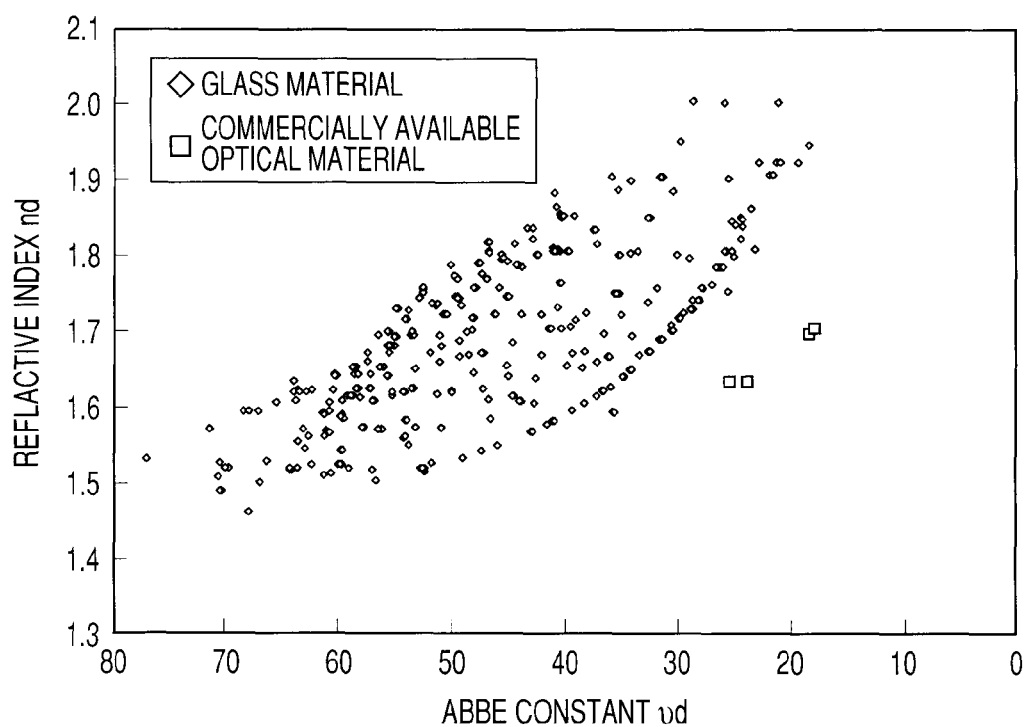
FIG. 1B is a distribution graph illustrating a relationship between the Abbe constant and a refractive index in each of the normal optical materials.

An optical material according to the present invention includes a polymer of a mixture which contains a sulfur-containing compound represented by the following general formula (1), a sulfur-containing compound represented by the following general formula (2), and an energy polymerization initiator. A content of the sulfur-containing compound represented by the general formula (2) is 10% by weight or more to 60% by weight or less. A refractive index nd of the polymer of the mixture satisfies desirably 1.64<nd<1.69, more desirably 1.65<nd<1.68. An Abbe constant vd thereof satisfies desirably 18<vd<23, more desirably 19<vd<22. A secondary dispersion property θg,F thereof satisfies desirably 0.68<θg,F<0.69, more desirably 0.683<θg,F<0.687.

General Formula (1):

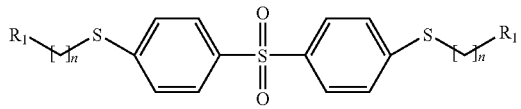

where $R_1$ is —$X_1$—COCR$_2$=CH$_2$ or —$X_1$—CH=CH$_2$, $R_2$ is H or CH$_3$, $X_1$ is O or S, and n is an integer of 1 to 4.

General Formula (2):

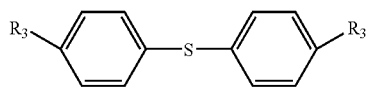

where $R_3$ is —S—CH=CH$_2$ or —CH=CH$_2$.

According to the optical material of the present invention, the content of a sulfone skeleton or an acrylic skeleton, which mainly causes an increase in water absorption rate, and the content of a sulfide skeleton, which mainly causes yellowing, are optimally controlled in view of their molecular structure. Therefore, a compound which has less yellowing, a high transmittance, and excellent environmental reliability corresponding to a low water absorption property may be manufactured.

The water absorption rate of the polymer of the mixture is desirably 0.2% or more to 0.5% or less. In a case of a cured film which has a thickness of 1.5 mm and is obtained by curing a film of the optical material, according to the present invention, which is formed on a substrate, an internal transmittance for light having a wavelength of 430 nm is larger than 80% and smaller than 99%.

In the present invention, the Abbe constant vd and the secondary dispersion property θg,F are expressed by the following expressions.

Abbe constant(v$d$)=($nd$−1)/($nF$−$nC$)

Secondary dispersion property(θg,F)=($ng$−$nF$)/($nF$−$nC$)

where ng is a refractive index at a wavelength of 435.8 nm corresponding to a g line, nF is a refractive index at a wavelength of 486.1 nm corresponding to an F line, nd is a refractive index at a wavelength of 587.6 nm corresponding to a d line, and nC is a refractive index at a wavelength of 656.3 nm corresponding to a C line.

The respective physical property values such as the refractive index, the Abbe constant, and the secondary dispersion property of the optical material according to the present invention are values obtained by measurement in a state in which the optical material is cured. Normal measurement is performed in a state in which a liquid optical material is sandwiched between two glass substrates and cured as a thin film (approximately 1 mm). The internal transmittance in the present invention is measured in the same manner.

Each of the sulfur-containing compounds included in the optical material according to the present invention desirably contains, in a molecule, at least one kind of group selected from the group consisting of a sulfide group, a sulfone group, a sulfoxide group, a thiol (mercaptan) group, and a thioester group, in order to obtain desired optical properties. In particular, of the compounds, a resin which contains a polymerizable functional group such as an unsaturated ethylene group and may be cured by energy such as light or heat is suitable.

(First Sulfur-Containing Compound)

Specific examples of the sulfur-containing compound which is used in the present invention and represented by the general formula (1) include bis(4-acryloxyethylthiophenyl)sulfone, bis(4-methacryloxyethylthiophenyl)sulfone, bis(4-vinyloxyethylthiophenyl)sulfone, bis(4-acryloylthioethylthiophenyl)sulfone, bis(4-methacryloylthioethylthiophenyl)sulfone, and bis(4-vinylthioethylthiophenyl)sulfone. Alternatively, the specific examples may include polymers thereof. The sulfur-containing compound represented by the general formula (1) includes a dithiophenyl sulfone skeleton as a base, and has a polymerizable functional group containing —O— or —S— in the molecular structure other than the dithiophenyl sulfone skeleton.

The content of the sulfur-containing compound which is included in the optical material according to the present invention and represented by the general formula (1) is desirably 40% by weight or more to 90% by weight or less, more desirably 45% by weight or more to 85% by weight or less.

The sulfur-containing compound represented by the general formula (1) may be not one kind but a mixture of several kinds of materials. If necessary, a cross-linking agent or a release agent may be added. In this case, it is desirable to select a material having excellent compatibility.

(Second Sulfur-Containing Compound)

Specific examples of the sulfur-containing compound which is used in the present invention and represented by the general formula (2) include bis(4-vinylthiophenyl)sulfide and bis(4-styrenyl)sulfide. Alternatively, the specific examples may include polymers thereof. The sulfur-containing compound represented by the general formula (2) includes a diphenyl sulfide skeleton as a base, and has a polymerizable functional group containing or not containing —S— in the molecular structure other than the diphenyl sulfide skeleton.

A content of the sulfur-containing compound which is included in the optical material according to the present invention and represented by the general formula (2) is desirably 10% by weight or more to 60% by weight or less, more desirably 15% by weight or more to 55% by weight or less. When the content is smaller than 10% by weight, the water absorption property becomes smaller. When the content exceeds 60% by weight, a yellowing property becomes larger. This is not desirable for the optical material.

The sulfur-containing compound represented by the general formula (2) may be not one kind but a mixture of several kinds of materials. If necessary, a release agent or a cross-linking agent may be added. In this case, it is desirable to select a material having excellent compatibility.

(Polymerization)

In order to polymerize the sulfur-containing compound represented by the general formula (1) and the sulfur-containing compound represented by the general formula (2), the energy polymerization initiator is used for the optical material according to the present invention. A photopolymerization initiator or a thermal polymerization initiator is used as the energy polymerization initiator.

In the case where a photo-polymerizable resin is used, as the photopolymerization initiator, a radical polymerization initiator is used to utilize a radical formation mechanism based on photoirradiation. In general, the initiator is desirably used for molding a replica of a lens or the like. Desirable specific examples of the photopolymerization initiator include 2-benzyl-2-dimethylamino-1-(4-morpholinophenyl)-1-butanone, 1-hydroxycyclohexyl phenyl ketone, 2-hydroxy-2-methyl-1-phenyl-propan-1-one, bis(2,4,6-trimethylbenzoyl)-phenylphosphineoxide, 4-phenylbenzophenone, 4-phenoxybenzophenone, 4,4'-diphenylbenzophenone, and 4,4'-diphenoxybenzophenone.

Note that the ratio of the photopolymerization initiator to be added to a polymerizable resin component may be appropriately selected depending on the irradiation level and the additional heating temperature, and may also be adjusted depending on the desired average molecular weight of a polymer produced. In the case where the initiator is used for curing and molding of the optical materials according to the present invention, the amount of the photopolymerization initiator to be added to the polymerizable component is desirably 0.01% by weight or more to 10.00% by weight or less with respect to the optical materials. The photopolymerization initiator may be used singly or two or more kinds thereof may be used in combination, depending on the reactivity to the resin or wavelength of the irradiated light.

As a photopolymerization initiator in addition to the radical polymerization initiator, a cationic polymerization initiator may also be used to utilize a cation formation mechanism based on photoirradiation. The cationic polymerization initiator is desirably used for film formation or molding in the case where oxygen inhibition should be polymerized under condition. A typical example of the photopolymerization initiator that may be used includes Irgacure 250, which exhibits excellent curing properties and realizes few signs of yellowing by exposure to a sufficient amount of ultraviolet light. Specific example of the cation polymerization initiator is shown above, but the initiator is not limited thereto.

In the case where a thermally polymerizable resin is used in the present invention, as the thermal polymerization initiator, a radical polymerization initiator may be used to utilize a radical formation mechanism based on heating. In general, the initiator is desirably used for molding a replica of a lens or the like. Desirable examples of the thermal polymerization initiator include azobisisobutyronitrile (AIBN), benzoyl peroxide, t-butyl peroxypivalate, t-butyl peroxyneohexanoate, t-hexyl peroxyneohexanoate, t-butyl peroxyneodecanoate, t-hexyl peroxyneodecanoate, cumyl peroxyneohexanoate, and cumyl peroxyneodecanoate. Note that, the ratio of the thermal polymerization initiator to be added to a polymerizable component may be appropriately selected depending on the heating temperature and oxygen content in molding. In addition, the ratio may be adjusted depending on the desired polymerization degree of a molded article produced. In the case where the initiator is used for curing and molding of the optical materials according to the present invention, the amount of the thermal polymerization initiator to be added to the polymerizable component is desirably 0.01% by weight or more to 10.00% by weight or less with respect to the optical materials. The thermal polymerization initiator may be used singly or two or more kinds thereof may be used in combination depending on the reactivity to the resin or the desired heating temperature.

The radical polymerization initiator and the cationic polymerization initiator may be used singly or both may be used in combination. Further, the photopolymerization initiator and the thermal polymerization initiator may also be used in combination.

(Manufacturing Method)

Next, a method of manufacturing the first optical material according to this embodiment is described with reference to a typical case where the first optical material contains a photopolymerizable resin component using a radical generation mechanism induced by light.

The sulfur-containing compound represented by the general formula (1), the sulfur-containing compound represented by the general formula (2), the photo radical polymerization initiator, the cross-linking agent (as required), and the release agent (as required) are mixed at a desired mixing ratio and dissolved. In order to realize uniform dissolution, heating may be performed by an oven during dissolution. In this case, when the temperature is excessively high, it is likely to cause the decomposition or reaction of the respective compounds. Therefore, the temperature is desirably adjusted to a minimum value as long as the uniform dissolution is achieved. Thus, an optical material having a high transmittance, low water absorption rate, a high refractive index, a low Abbe constant, and a high secondary dispersion property is obtained as the optical material according to the present invention.

Next, a method of molding, on a substrate made of a light transmission material such as glass, an optical element having a layer structure obtained by photo-polymerizing the first optical material is described with reference to FIGS. 2A to 2D. For ease of description, FIGS. 2A to 2D illustrate an example not of an optical element having a curved surface, but of an optical element having a flat shape.

Figure 2A:
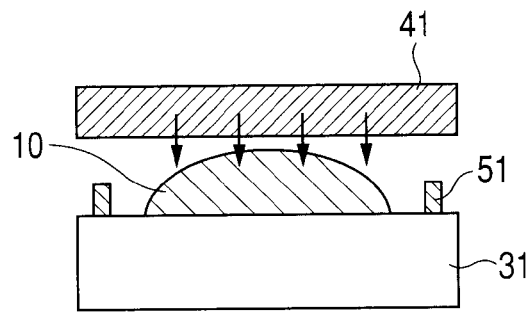
FIGS. 2A, 2B, 2C, and 2D are process views illustrating a method of manufacturing a molded member in Example 1.
Figure 2B:
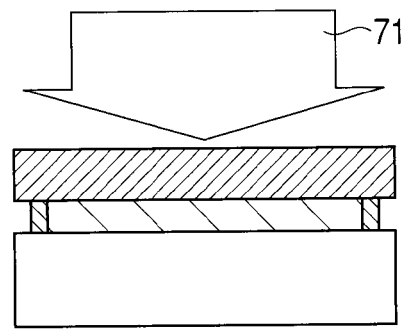

Firstly, a first optical material 10 having flowability is caused to flow into between a glass substrate 41 and a flat-shaped mold 31 that is opposed to the glass substrate 41 and made of a metal material. Next, as illustrated in FIG. 2A, the optical material 10 is loaded by the glass substrate 41, and the optical material 10 is expanded and filled in the gap among the glass substrate 41, the flat-shaped mold 31, and a spacer 51. Next, as illustrated in FIG. 2B, the optical material 10 is irradiated with ultraviolet light 71 through the glass substrate 41 to photo-polymerize the optical material 10. The light used for the irradiation causing photopolymerization reaction is light having a suitable wavelength corresponding to a mechanism causing radical generation using the photopolymerization initiator. In some cases, not the ultraviolet light but visible light may be used. The optical material 10 including a monomer is desirably uniformly irradiated with light. The amount of irradiation of light is selected as appropriate correspondingly to the mechanism causing radical generation using the photopolymerization initiator or correspondingly to a content ratio of the contained photopolymerization initiator.

Figure 2C:
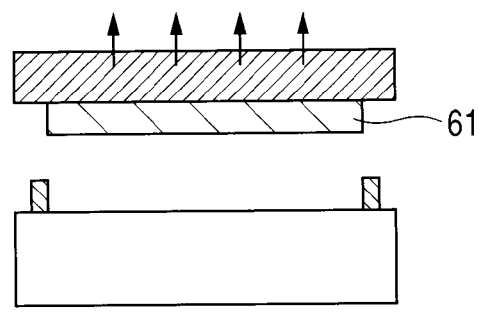
Figure 2D:
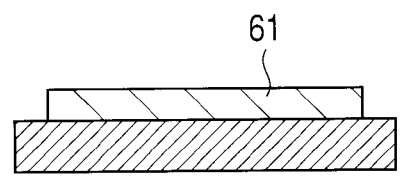

According to the polymerization reaction of the optical material 10 in FIG. 2B, a molded member 61 made of the optical material 10 is bonded to the glass substrate 41. In FIG. 2C, the molded member 61 integrally formed with the glass substrate 41 is released from the flat-shaped mold 31. The released molded member 61 and the glass substrate 41 are annealed to produce an optical element illustrated in FIG. 2D. A reduction in total thickness of the molded member made of the optical material formed on the light transmission material used for the substrate is more suitable for the present invention. When the total thickness of the molded member made of the optical material is made large, it is necessary to select the amount of irradiation, the irradiation intensity, and the light source in further consideration of a reactivity of curing and the absorption of light of resin components or the like.

The molded member may be manufactured by a thermal polymerization method. In this case, a temperature of the entire molded member is desirably made more uniform.

Example 1

Bis(4-methacryloxyethylthiophenyl)sulfone represented by the following Chemical Formula-1 was used as the sulfur-containing compound represented by the general formula (1). Bis(4-vinylthiophenyl)sulfide (MPV) represented by the following Chemical Formula-2 was used as the sulfur-containing compound represented by the general formula (2). The sulfur-containing compounds were mixed at a weight ratio of 1:1 (=(Chemical Formula-1):(Chemical Formula-2)) and melted. A photopolymerization initiator, Darocur 1173 (produced by Ciba Japan K.K.) was added to the obtained mixture at 3% by weight with respect to a total weight of the mixture and prepared to obtain an optical material 11 having entirely uniform compatibility.

Chemical Formula-1:

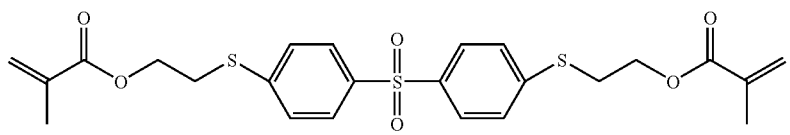

Chemical Formula-2:

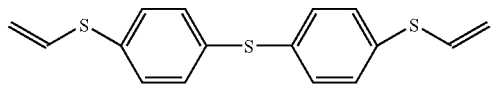

Next, molded members were obtained from the optical material 11 by the manufacturing steps illustrated in FIGS. 2A to 2D. As illustrated in FIGS. 2A to 2D, the optical material 11 was sandwiched and fixed between the flat-shaped mold 31 and the glass substrate 41 using the spacer 51. Then, the ultraviolet light 71 (total irradiation amount: 10 J) was emitted from above the glass substrate 41 to obtain a molded member 11 having a thickness of 1.5 mm. After that, the obtained molded member 11 was annealed at 80° C. for 7 hours.

Figure 3A:
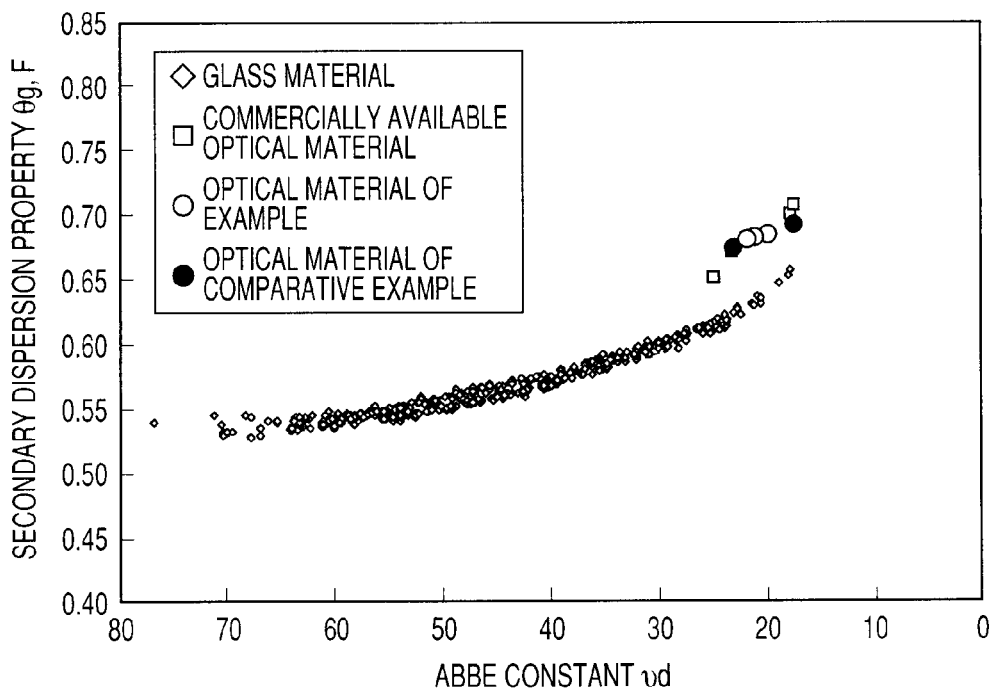
FIG. 3A is a distribution graph illustrating a relationship between an Abbe constant and a secondary dispersion property in each of optical materials according to Examples 1 to 3 and Comparative Examples 1 and 2.
Figure 3B:
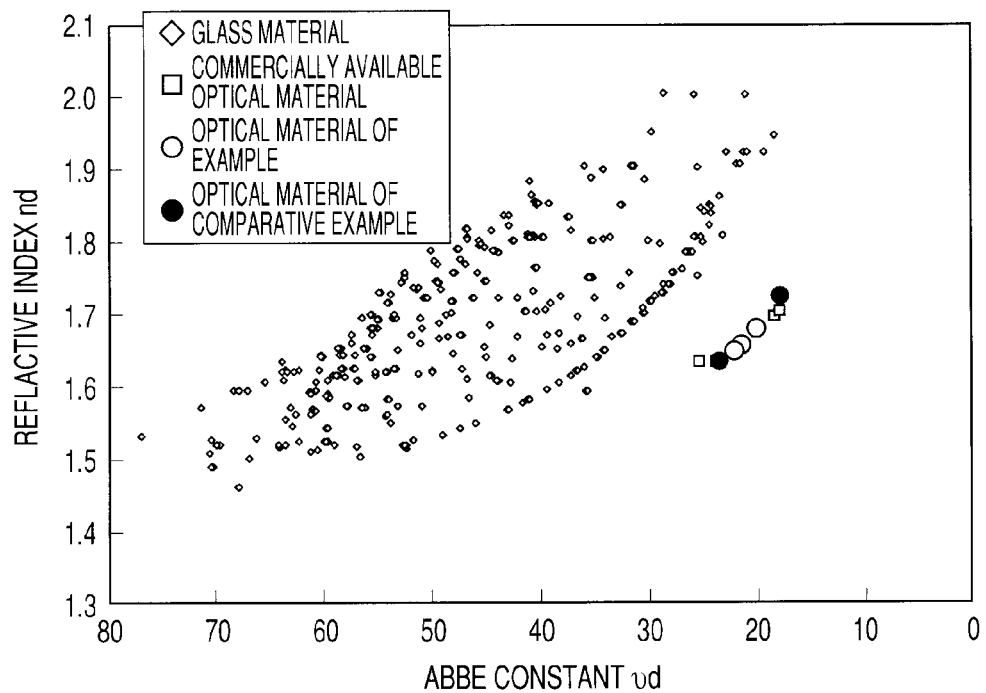
FIG. 3B is a distribution graph illustrating a relationship between the Abbe constant and a refractive index in each of the optical materials according to Examples 1 to 3 and Comparative Examples 1 and 2.

The refractive index nd, the Abbe constant νd, and the secondary dispersion property θg,F in the molded member 11 and the relationships thereamong are illustrated in Table 1 and FIGS. 3A and 3B. A measured internal transmittance of the molded member 11 is illustrated in Table 1. A measured water absorption rate thereof is illustrated in Table 2.

Examples 2 and 3

In the same manner an in Example 1, Bis(4-methacryloxyethylthiophenyl)sulfone represented by Chemical Formula-1 was used as the sulfur-containing compound represented by the general formula (1). Bis(4-vinylthiophenyl)sulfide (MPV) represented by Chemical Formula-2 was used as the sulfur-containing compound represented by the general formula (2). The sulfur-containing compounds were mixed at a weight ratio of 3:1 (Example 2) and 5:1 (Example 3), respectively (=(Chemical Formula-1):(Chemical Formula-2)) and melted. As a photopolymerization initiator, Darocur 1173 (produced by Ciba Japan K.K.) was added to the obtained mixture at 3% by weight with respect to a total weight of the mixture and prepared to obtain an optical material 12 (Example 2) and an optical material 13 (Example 3) having entirely uniform compatibility.

In the same manner as in Example 1, a molded member 12 and a molded member 13 having a thickness of 1.5 mm were obtained from the optical material 12 and the optical material 13, respectively, by the steps illustrated in FIGS. 2A to 2D. After that, the obtained molded member 12 and the molded member 13 were annealed at 80° C. for 7 hours.

Relationships among the refractive index nd, the Abbe constant νd, and the secondary dispersion property θg,F in the molded member 12 and the molded member 13 are illustrated in Table 1 and FIGS. 3A and 3B. The internal transmittances of the molded members 12 and 13 were measured. The results obtained by measurement are illustrated in Table 1.

The refractive index nd, the Abbe constant νd, and the secondary dispersion property θg,F in each of the molded members 12 and 13 and relationships thereamong are illustrated in Table 1 and FIGS. 3A and 3B. Measured internal transmittances of the molded members 12 and 13 are illustrated in Table 1. Measured water absorption rates thereof are illustrated in Table 2.

Comparative Example 1

A photopolymerization initiator, Darocur 1173 (produced by Ciba Japan K.K.) was added to bis(4-methacryloxyethylthiophenyl)sulfone represented by the Chemical Formula-1 at 3% by weight with respect to a total weight of bis(4-methacryloxyethylthiophenyl)sulfone and prepared to obtain an optical material 14 having entirely uniform compatibility.

In the same manner as in Example 1, a molded member 14 having a thickness of 1.5 mm was obtained from the optical material 14 by the method including the manufacturing steps illustrated in FIGS. 2A to 2D. After that, the obtained molded member 14 was annealed at 80° C. for 7 hours. The refractive index nd, the Abbe constant νd, and the secondary dispersion property θg,F in the molded member 14 and relationships thereamong are illustrated in Table 1 and FIGS. 3A and 3B. A measured internal transmittance of the molded member 14 is illustrated in Table 1. A measured water absorption rate thereof is illustrated in Table 2.

Comparative Example 2

As a photopolymerization initiator, Darocur 1173 (produced by Ciba Japan K.K.) was added to bis(4-vinylthiophenyl)sulfide (MPV) represented by the Chemical Formula-2 at 3% by weight with respect to a total weight of bis(4-vinylthiophenyl)sulfide and prepared to obtain an optical material 15 having entirely uniform compatibility.

In the same manner as in the case of Example 1, a molded member 15 having a thickness of 1.5 mm was obtained from the optical material 15 by the method including the manufacturing steps illustrated in FIGS. 2A to 2D. After that, the obtained molded member 15 was annealed at 80° C. for 7 hours. The refractive index nd, the Abbe constant νd, and the secondary dispersion property θg,F in the molded member 15 and relationships thereamong are illustrated in Table 1 and FIGS. 3A and 3B. A measured internal transmittance of the molded member 15 is illustrated in Table 1. A measured water absorption rate thereof is illustrated in Table 2.

Note that the refractive index, the internal transmittance, and the optical scattering rate in each of the molded members were measured as follows.

(1) Refractive Index nd

The refractive index of the molded member having the thickness of 1.5 mm was measured using an Abbe refractometer (produced by Kalnew Optical Industry Company).

(2) Internal Transmittance

The internal transmittance of the molded member which has the thickness of 1 min and is molded on the glass substrate as described in Example 1 was measured together with the glass substrate. A value obtained by removing, from a measurement value, a variation in transmittance which is caused by the glass substrate is the internal transmittance of the molded member. In a case of incident light (T0), measured transmitting light (T5), a refractive index (n1) of the molded member, a refractive index (n2) of the glass substrate, the internal transmittance of the molded member alone was obtained by the following expression.

Internal transmittance of molded member(%)=$T5/(n01t \times n12t \times n20t)$ where
n01t is a transmittance factor on an interface between the molded member and air, $n01t=((n1-1)/(n1+1))^2$, n12t is a transmittance factor on an interface between the molded member and the glass substrate, $n12t=((n2-n1)/(n2+n1))^2$, n20t is a transmittance factor on an interface between the glass substrate and air, and $n20t=((1-n2)/(1+n2))^2$.

(3) Water Absorption Rate

The water absorption rate of each of the molded members was determined as follows. Each of the molded members was set in an environmental test furnace at a temperature of 60° C. and a humidity of 90% (environmental reliability test). A temporal change in weight of each of the molded members was measured after an elapse of 1,000 hours and converted into the water absorption rate by the following expression.

(Water absorption rate)(%)=(((weight of molded member after environmental reliability test)−(initial weight of molded member))/(initial weight of molded member))×100

TABLE 1

| | Material | Molded member (1.5 mm in thickness) | Optical properties | | | Internal transmittance at 430 nm in wavelength % | Total determination |
|---|---|---|---|---|---|---|---|
| | | | nd | νd | θg, F | | |
| Example 1 | Optical material 11 | Molded member 11 | 1.680 | 19.8 | 0.685 | 89.3 | ○ |
| Example 2 | Optical material 12 | Molded member 12 | 1.657 | 21.1 | 0.684 | 91.2 | ○ |
| Example 3 | Optical material 13 | Molded member 13 | 1.650 | 21.7 | 0.683 | 93.1 | ○ |
| Comparative | Optical | Molded | 1.634 | 23.1 | 0.676 | 98.5 | x |

TABLE 1-continued

| | Material | Molded member (1.5 mm in thickness) | Optical properties | | | Internal transmittance at 430 nm in wavelength % | Total determination |
|---|---|---|---|---|---|---|---|
| | | | nd | vd | θg, F | | |
| Example 1 | material 14 | member 14 | | | | | |
| Comparative Example 2 | Optical material 15 | Molded member 15 | 1.724 | 17.5 | 0.694 | 74.1 | x |

In Table 1, when the refractive index nd of the polymer of the mixture satisfies $1.64 < nd < 1.69$, the Abbe constant vd thereof satisfies $18 < vd < 23$, the secondary dispersion property θg,F thereof satisfies $0.68 < θg,F < 0.69$, and the internal transmittance at the wavelength of 430 nm is larger than 80% and smaller than 99%, a circle mark ○ was used in total determination. When any one of the values is not satisfied, a cross mark x was used.

The optical material 14 prepared in Comparative Example 1 has an excellent transparent property, but does not satisfy any of the optical properties of the refractive index nd, the Abbe constant vd, and the secondary dispersion property θg,F. The optical material 15 prepared in Comparative Example 2 does not satisfy the optical properties and the internal transmittance.

mination. On the other hand, when the internal transmittance is outside the change range, the cross mark x was used. With respect to the total determination, the circle mark ○ was used for determinations including no cross marks x in Tables 1 and 2.

(Element Shape)

Optical elements having a desired shape were molded using the optical materials described above by the method described above. As a result, as is apparent from the total determination, the optical elements molded using the optical materials 11 to 13 were excellent in environmental reliability. A large change of plane distortion was not particularly observed, and hence excellent optical materials were obtained.

TABLE 2

| | Material | Molded member (1.5 mm in thickness) | Water absorption rate (%) | Determination of water absorption rate | Determination of optical properties after environmental reliability test | Determination of internal transmittance after environmental reliability test | Total determination |
|---|---|---|---|---|---|---|---|
| Example 1 | Optical material 11 | Molded member 11 | 0.28 | ○ | ○ | ○ | ○ |
| Example 2 | Optical material 12 | Molded member 12 | 0.36 | ○ | ○ | ○ | ○ |
| Example 3 | Optical material 13 | Molded member 13 | 0.43 | ○ | ○ | ○ | ○ |
| Comparative Example 1 | Optical material 14 | Molded member 14 | 0.73 | x | x | ○ | x |
| Comparative Example 2 | Optical material 15 | Molded member 15 | 0.18 | ○ | ○ | x | x |

In Table 2, when the water absorption rate after the environmental reliability test for 1,000 hours is smaller than 0.6%, the circle mark ○ was used. On the other hand, when the water absorption rate is 0.6% or more, the cross mark x was used.

With respect to the determination of the optical properties, after the environmental reliability test for 1,000 hours, when the refractive index nd is within a change range of ±0.005, the Abbe constant vd is within a change range of ±0.8, and the secondary dispersion property θg,F is within a change range of ±0.008, the circle mark ○ was used. On the other hand, when the optical properties are outside the change ranges, the cross mark x was used. After the environmental reliability test for 1,000 hours, when the internal transmittance is within a change range of ±5%, the circle mark ○ was used for deter- In this way, it was confirmed that the respective optical materials of the examples of the present invention have the high transmittance, the high refractive index, the low Abbe constant, the high secondary dispersion property, and the low water-absorption rate. In addition, it was also confirmed that the respective optical materials according to the examples have the excellent environmental reliability and are useful as a desired optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-243191, filed Sep. 22, 2008, and No. 2009-197419, Aug. 27, 2009, which are hereby incorporated by reference herein in their entirety.

What is claimed is:

1. An optical material comprising a polymer of a mixture of:

a sulfur-containing compound represented by the following formula (1):

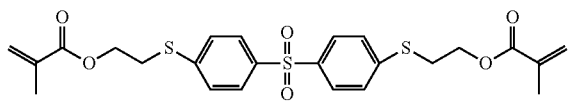 [SMILES: C=C(C)C(=O)OCCSc1ccc(S(=O)(=O)c2ccc(SCCOC(=O)C(=C)C)cc2)cc1]

a sulfur-containing compound represented by the following formula (2):

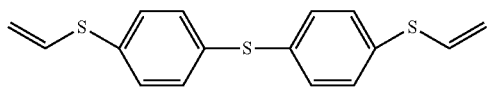 [SMILES: C=CSc1ccc(Sc2ccc(SC=C)cc2)cc1]

and an energy polymerization initiator, wherein the content of the sulfur containing compound represented by the general formula (2) is 16.2% by weight or more to 48.5% by weight or less, the Abbe constant vd of the polymer of the mixture satisfies $18<vd<23$, and the secondary dispersion property $\theta g,F$ thereof satisfies $0.68<\theta g,F<0.69$.

2. The optical material according to claim 1, wherein the refractive index nd of the polymer of the mixture satisfies $1.64<nd<1.69$.

3. The optical material according to claim 1, wherein the water absorption rate of the polymer of the mixture is 0.2% or more to 0.5% or less.

4. An optical element obtained by curing the optical material according to claim 1, wherein the internal transmittance of the optical element with respect to light having a wavelength of 430 nm in a thickness of 1.5 mm is larger than 80% and smaller than 99%.

* * * * *